(12) United States Patent
Ferrier et al.

(10) Patent No.: US 10,837,706 B2
(45) Date of Patent: Nov. 17, 2020

(54) HEAT EXCHANGER FITTED WITH UPSTREAM COVER TO REDUCE DISTURBANCE TO FLUID FLOW IN A TURBOMACHINE

(71) Applicant: SAFRAN AIRCRAFT ENGINES, Paris (FR)

(72) Inventors: Romain Jean-Claude Ferrier, Brunoy (FR); Irwin Pierre Robert Kernemp, Alfortville (FR); Jonathan David Robert Langridge, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/003,149

(22) Filed: Jun. 8, 2018

(65) Prior Publication Data
US 2018/0356157 A1     Dec. 13, 2018

(30) Foreign Application Priority Data

Jun. 12, 2017 (FR) ...................... 17 55234

(51) Int. Cl.
*F28D 1/02* (2006.01)
*F28F 9/00* (2006.01)
(Continued)

(52) U.S. Cl.
CPC ........... *F28D 1/0233* (2013.01); *F01D 25/12* (2013.01); *F02C 7/18* (2013.01); *F28F 9/001* (2013.01);
(Continued)

(58) Field of Classification Search
CPC . F02C 7/14; F02C 7/185; B64D 33/08; B64D 33/10; F28D 2021/0021
See application file for complete search history.

(56) References Cited

U.S. PATENT DOCUMENTS 1,376,178 A * 4/1921 Wagenseil ............. B64D 33/10
                                                        180/68.4
5,729,969 A * 3/1998 Porte ........................ F02C 6/08
                                                        60/226.1
(Continued)

FOREIGN PATENT DOCUMENTS

EP     2 724 940     4/2014
EP     2 894 323     7/2015

OTHER PUBLICATIONS

French Search Report dated Feb. 19, 2018, issued in French Application No. 17 55234, filed Jun. 12, 2017 (with English Translation of Categories of Cited Documents).

*Primary Examiner* — Eric S Ruppert
(74) *Attorney, Agent, or Firm* — Oblon, McClelland, Maier & Neustadt, L.L.P.

(57) ABSTRACT

A heat exchanger designed to be fixed to a turbomachine wall delimiting a gas flow stream, this exchanger including a body with a front face through which the gas flow passes; an attachment face to the wall; an external face opposite the attachment face and connected to the front face; two lateral faces connected to the front face; a cover surrounding the front face and extending along the prolongation of the external face and the lateral faces, to delimit an intake with an area smaller than the area of the front face, this intake being located upstream from the front face relative to the gas flow stream.

7 Claims, 3 Drawing Sheets

(51) Int. Cl.
*F02C 7/18* (2006.01)
*F01D 25/12* (2006.01)
*F02C 7/06* (2006.01)
*F28D 21/00* (2006.01)

(52) U.S. Cl.
CPC .......... *F02C 7/06* (2013.01); *F05D 2220/323* (2013.01); *F05D 2250/512* (2013.01); *F05D 2260/20* (2013.01); *F05D 2260/213* (2013.01); *F05D 2260/97* (2013.01); *F05D 2260/98* (2013.01); *F28D 2021/0021* (2013.01); *F28D 2021/0049* (2013.01)

(56) References Cited

U.S. PATENT DOCUMENTS

| | | | |
|---|---|---|---|
| 7,377,100 B2 * | 5/2008 | Bruno | F01D 25/12 60/266 |
| 7,861,512 B2 * | 1/2011 | Olver | F02C 7/14 60/226.1 |
| 2008/0053060 A1 | 3/2008 | Olver | |
| 2008/0099630 A1 * | 5/2008 | Parikh | B64D 13/00 244/53 B |
| 2008/0230651 A1 * | 9/2008 | Porte | B64D 13/06 244/118.5 |
| 2013/0291554 A1 * | 11/2013 | Marini | F02C 6/08 60/785 |
| 2016/0348585 A1 * | 12/2016 | Marini | F02K 3/115 |

* cited by examiner

HEAT EXCHANGER FITTED WITH UPSTREAM COVER TO REDUCE DISTURBANCE TO FLUID FLOW IN A TURBOMACHINE

TECHNICAL DOMAIN

The invention relates to a turbomachine such as a turbojet, through which at least one gas flow stream passes, this flow stream being delimited by an internal wall in this engine.

STATE OF PRIOR ART

In such an engine, air is drawn in through an intake duct to pass through a fan comprising a series of rotating blades before being split into a central core flow and a bypass flow surrounding the core flow.

The primary flow is compressed by compressors before reaching a combustion chamber, after which it expands through turbines before being evacuated, generating a thrust. The bypass flow is propelled directly by the fan to generate a complementary thrust.

The core flow and the bypass flow circulate in a core flow stream and a bypass flow stream respectively, separated by a space called the inter flow streams space.

The exterior of the core flow stream is delimited by an internal wall of the inter flow streams space and the interior of the bypass flow stream is delimited by an external wall of the inter flows streams space and the exterior of the bypass flow stream is delimited by an internal wall of a nacelle surrounding the turbojet.

In this type of engine, different components such as bearing blocks, bearings and others, are lubricated by oil that circulates in a hydraulic circuit containing a heat exchanger in the form of a heat sink to assure that this oil remains at a suitable temperature under all circumstances. Such an exchanger is usually denoted by the acronym ACOC (Air Cooled Oil Cooler).

This exchanger is fixed to a wall of the jet, and it projects from this wall such that a portion of the flow circulating in the jet along this wall passes through it so as to cool the oil in the hydraulic circuit.

Thus, such an exchanger is a relief shape that forms an obstacle introducing head losses in the flow stream in the engine.

The purpose of the invention is to disclose an arrangement for integration of such an exchanger that limits head losses that it introduces into the flow stream passing through this jet.

PRESENTATION OF THE INVENTION

To achieve this, the purpose of the invention is a heat exchanger designed to be fixed to a turbomachine wall delimiting a gas flow stream, this exchanger comprising a body with:
- a front face through which the gas flow passes;
- an attachment face to the wall;
- an external face opposite the attachment face and connected to the front face;
- two lateral faces connected to the front face;
- a cover surrounding the front face and extending along the prolongation of the external face and the lateral faces, to delimit an intake with an area smaller than the area of the front face, this intake being located upstream from the front face relative to the gas flow stream.

With this arrangement, the gas flow arriving at the intake to the upstream cover is separated into a flow entering the cover and a flow that bypasses this cover without generating turbulence.

Another purpose of the invention is such an exchanger comprising an external portion and lateral portions prolonging the external and lateral faces respectively of the exchanger body, that are terminated by edges in the form of lips delimiting the intake to the cover.

Another purpose of the invention is such an exchanger in which the edge terminating the external portion is in the form of a lip with an axis of symmetry oriented along a current line of the gas flow stream at this lip in the absence of an upstream cover.

Another purpose of this invention is such an exchanger in which each lip is formed by a fold of a wall forming the cover portion that this lip terminates.

Another purpose of the invention is such an exchanger in which the thickness of the lip terminating the external portion is greater than the thickness of the lips terminating the lateral portions.

The invention also relates to a turbomachine integrating an exchanger thus defined.

The invention also relates to an aircraft engine, comprising at least one turbomachine thus defined.

DETAILED PRESENTATION OF PARTICULAR EMBODIMENTS

The invention is based on the observation that the head loss introduced by a known type of exchanger is mainly due to the fact that its presence causes separation of the fluid flow at the largest external face of the exchanger body.

This separation of the boundary layer of the fluid flow causes local disturbances above the exchanger that also create a wake downstream in the flow, forming the main cause of head losses induced by the presence of the exchanger in the flow.

Figure 1:
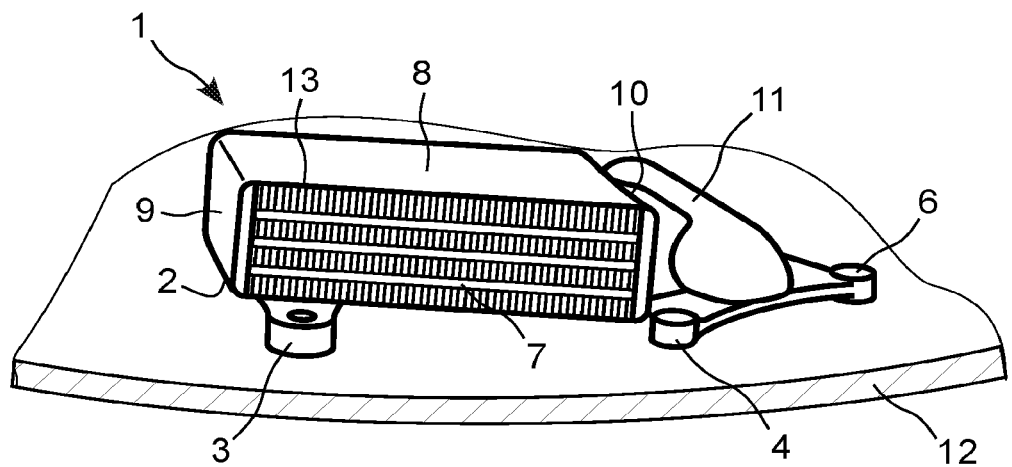
FIG. 1 is a perspective view of an exchanger body fixed to an engine wall.
Figure 2:
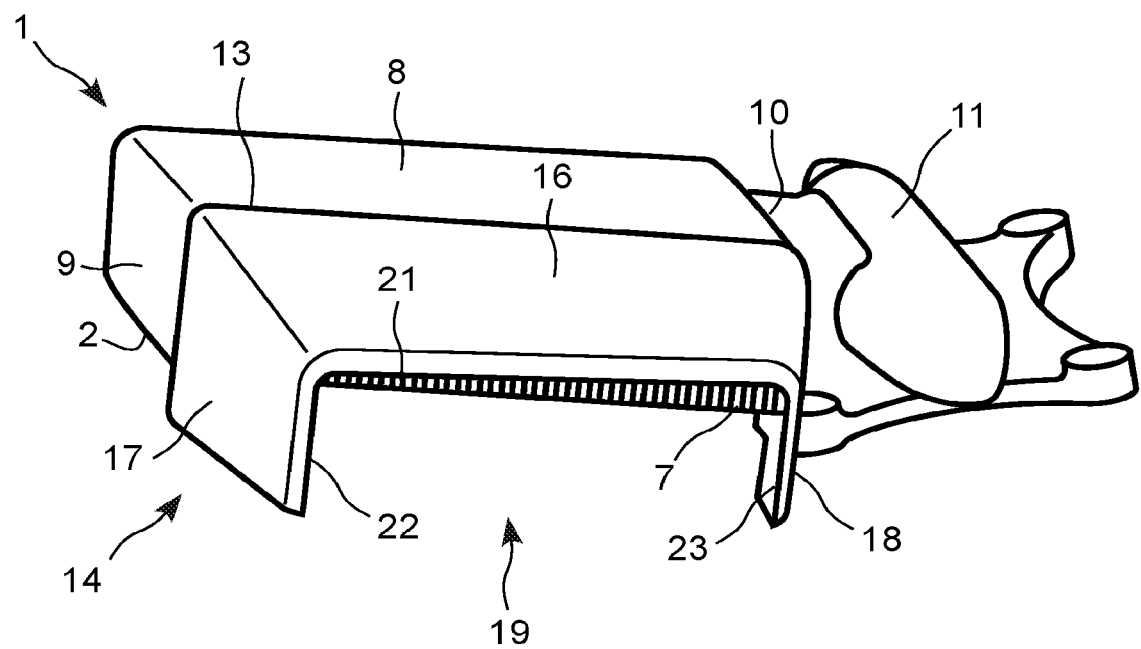
FIG. 2 is a perspective view of an exchanger fitted with an upstream cover according to the invention.

As can be seen on FIGS. 1 and 2, the body of the exchanger 1 according to the invention is generally parallelepiped in shape, and comprises an attachment face 2 from which attachments 3, 4, 6 project, a front face 7, an end face 8 opposite to and parallel to the attachment face 2 and a lateral face 9 that can also be seen on FIGS. 1 and 2. It also comprises another lateral face 10 opposite the face 9, and a back face.

The lateral face that cannot be seen is prolonged by a bulb 11 through which it is supplied with oil to be cooled that is supported by attachments 4 and 6 that extend beyond this other lateral face. This exchanger is fixed to an aircraft engine wall 12 by bolting its attachments 3, 4, 6, in this case this wall 12 being the internal wall of a case delimiting the conduit carrying the flow passing though the engine.

The front face 7 is oriented towards the upstream direction of the flow in the engine and part of this flow passes through it to cool the oil circulating in the body 1, and this flow runs along the external face 8 of the exchanger that is furthest from the wall 12, to continue its flow downstream from the exchanger.

Figure 3:
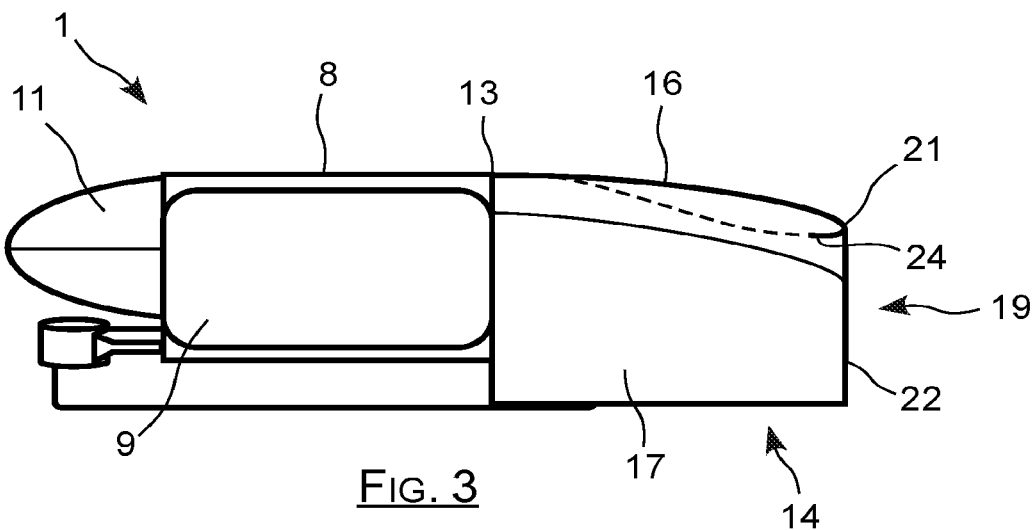
FIG. 3 is a lateral view of the exchanger according to the invention.
Figure 4:
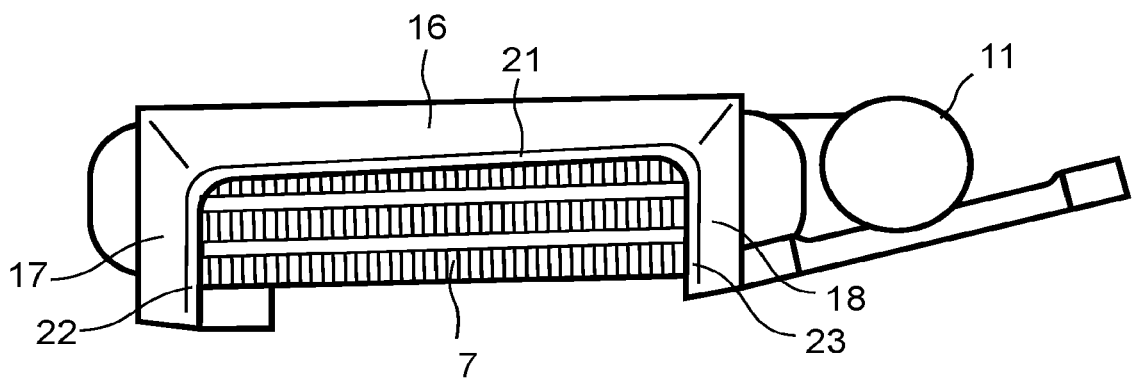
FIG. 4 is a front view of the exchanger according to the invention.

As can be seen more clearly on FIG. 3, the front face 7 extends approximately perpendicular to the wall 12, and the external face 8 extends approximately parallel to the generally cylindrical wall 12, while being the face furthest from this wall 12.

The front face 7 and the external face 8 are perpendicular to each other while being connected through an external edge 13 that is straight in the example in the figures. This edge is furthest from the wall 12 of the engine and has a projecting section in the example shown in the figures.

According to the invention, the exchanger is fitted with an upstream cover 14 represented on FIG. 2, that surrounds its front face 7 comprising an external portion 16 prolonging the external face 8 and lateral portions 17 and 18 that prolong the lateral faces 9 and 10 respectively of the exchanger body 1.

This cover is terminated by an opening or intake 19 with an approximately rectangular section delimited by a free external edge 21 of the external portion 16 prolonged by two free lateral edges 22 and 23 terminating the lateral portions 17 and 18 respectively, and by the engine wall 12.

These edges 21, 22 and 23 delimiting the intake 19 are in the form of lips to separate the flow inlet into the intake 19 and the flow along the external faces of the cover 14 occurs without separation of the boundary layer, in other words without generating any turbulence.

In the example in the figures, the shape of the lip at edge 21 is obtained by folding the end of the wall forming the external portion 16 on itself to confer a U-shape on it, this fold being represented on FIG. 3 on which it is denoted 24.

Figure 5:
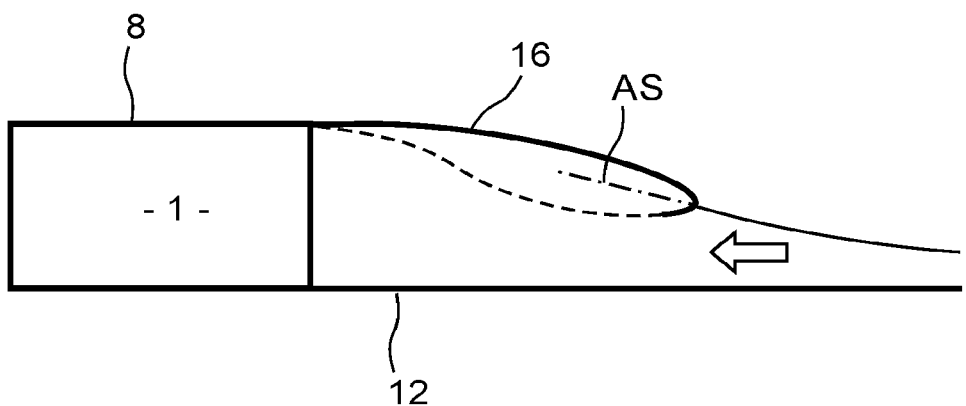
FIG. 5 is a diagrammatic view showing a longitudinal section through the exchanger according to the invention.

Due to this lip-shaped edge 21, the air flow that enters the intake 19 is deviated such that current line that bypasses the lip is separated from the internal face of the portion 16 and then returns along this internal face, this current line being denoted 26 on FIGS. 3 and 5. Thus, the air flow enters the intake 19 without generating any turbulence, and it then passes through the entire front face 7 of the exchanger body. In other words, the lip makes it possible to limit head losses and to separate the arriving flow at the cover.

The lateral edges 22 and 23 delimiting the intake 19 also have lip shapes that, in the example in the figures, are also formed by folding the ends of the lateral portions 17 and 18 terminated by these edges.

In general, the length of each lip is between 10% and 20% of the length of the cover, the ratio of the thickness of the lip to its length is 85% for the lip on the external edge 21 and 75% for the lips on the lateral edges 22 and 23.

The cover 14 may be fabricated from a cut plate element and folded such that its edges 21, 22, 23 are in the shape of lips, and then folded again to create its external portion 16 and its lateral portions 17 and 18.

In the example in the figures, the length of the upstream cover 14 is approximately equal to the length of the exchanger body 1. In other words, the distance separating the intake 19 from the front face 7 is approximately identical to the distance separating the front face 7 from the back face not marked of the exchanger body 1.

The intake 19 is thus located at a distance from the rectangular front face 7, while remaining smaller, in other words its height is less than the height of the body 1 and its body is less than the width of this body.

With reference to FIG. 1, the height of the body corresponds to the distance separating its attachment face 2 from its external face 8, and its width corresponds to the distance separating its lateral faces 9 and 10. Similarly, the height of the intake 19 of the cover 14 corresponds to the distance separating its external edge 21 from the wall 12 and to the length of its lateral edges 22 and 23, and its width corresponds to the length of the external edge 21.

The intake 19 is smaller than the front face 7 of the exchanger, in other words the surface area of the intake 19 is less than the surface area of the front face 7, such that the portions 16, 17 and 18 of the cover are convex and/or inclined relative to the faces 8, 9 and 10 of the exchanger body 1 that they prolong and that are plane.

In practice, if the intake 19 is too large, a large angle of attack is induced on the lip and consequently this lip has to be very thick, which increases head losses. Conversely, if the intake is too small, the divergence ratio becomes too large which causes separation of the flow inside the cover 14, resulting in a reduction of the flow passing through the exchanger.

More specifically, simulations show that the ideal area of the intake 19 is between 60% and 70%, in this case 64%, of the area of the face 7 of the exchanger body.

The divergence in the section of the upstream cover 14 is designed to be equivalent over the width and the height of this cover 14: the height of the intake 19 is equal to 80% of the height of the face 7, and the width of the intake 19 is also equal to 80% of the width of the front face 7, in the example in the figures.

With these proportions, the angle of inclination of the external portion 16 at the edge 21 optimises the fluid flow in the vicinity of the exchanger, by limiting separation of the fluid flow along the external face 8 that prolongs this portion 16. Air enters the intake 19 that has smaller dimensions than the front face 7 without generating any turbulence, and expands during its passage in the cover 14 to pass through the entire front face 7.

The external portion 16 is thus configured to enable separation of current lines passing in the exchanger and current lines passing above the exchanger without separation of the fluid flow.

As can be seen on FIG. 5, the lip of the external edge 21 is oriented such that its axis of symmetry is in line with the direction of the air flow without a cover, in other words if only the exchanger body 1 were present. This axis of symmetry denoted AS on FIG. 5 is located at mid-distance from the wall delimiting the external portion 16 and the fold 24. Since the variation in the angle of incidence of the fluid is higher at the external portion of the cover, the lip at the edge 21 is thicker and longer than the lips at the lateral edges 22 and 23.

The fact that the axis of symmetry AS is oriented along the current line in the absence of a cover minimises the average angle of incidence of the flow that can fluctuate with operating conditions.

Figure 6:
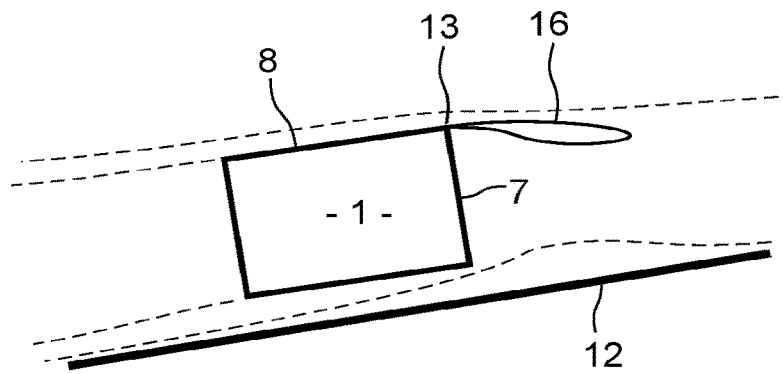
FIG. 6 is a representation of the fluid flow in the immediate vicinity of the exchanger according to the invention fitted with its deflector.
Figure 7:
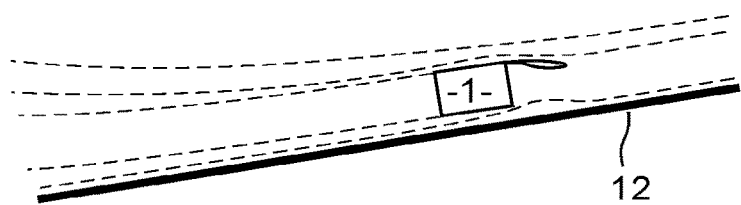
FIG. 7 is a representation of the fluid flow downstream from the exchanger according to the invention.

As can be seen on FIGS. 6 and 7, due to the cover that deviates the flow stream upstream from the external edge 13 of the exchanger body 1, the fluid flow occurs without separation of the boundary layer along the external face 8, and at the same without turbulence. Consequently, the wake from the exchanger downstream from the flow is significantly reduced, which is also representative of a reduction in head losses.

Figure 8:
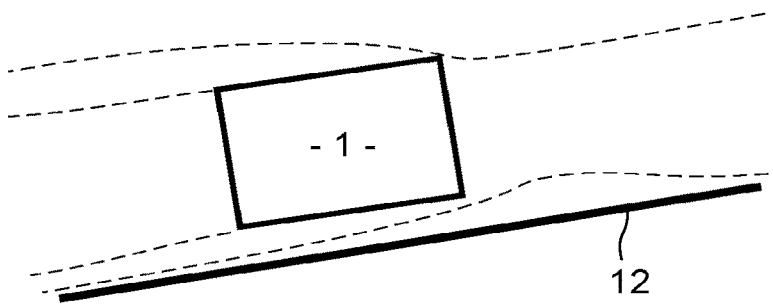
FIG. 8 is a representation of the fluid flow in the immediate vicinity of the exchanger without a deflector.
Figure 9:
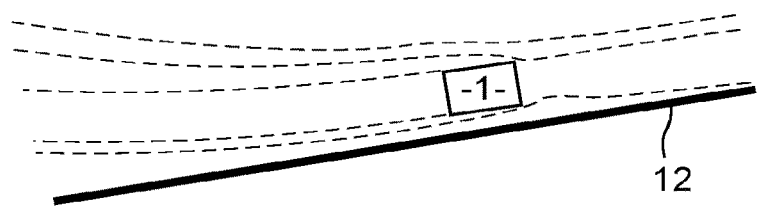
FIG. 9 is a representation of the fluid flow downstream from the exchanger without a deflector.

For comparison, FIGS. 8 and 9 that show the shape of the flow in the absence of an upstream cover show separation of the boundary layer above the external face 8 that corresponds to the creation of turbulence causing a large radial diffusion of the wake from the exchanger downstream along the flow direction, which is also representative of a reduction in head losses.

In the example in the figures, head losses introduced by the exchanger are reduced by about 20% due to use of the deflector.

This upstream cover 14 is mounted by fixing it with bolts (not shown) on the front part of the exchanger body 1, or it can be glued around the upstream edge surrounding the front face 7 of this exchanger body.

The invention claimed is:

1. A heat exchanger designed to be fixed to a turbomachine wall delimiting a gas flow stream, said exchanger comprising a body with:
    a front face through which the gas flow passes;
    an attachment face to the wall;
    an external face opposite the attachment face and connected to the front face;
    two lateral faces connected to the front face;
    a cover surrounding the front face, the cover comprising an external portion prolonging the external face and lateral portions prolonging the lateral faces, to delimit an intake with an area smaller than the area of the front face, the intake being located upstream from the front face relative to the gas flow stream, and the intake being delimited by a free external edge of the external portion prolonged by two free lateral edges terminating the lateral portions, and by the turbomachine wall,
    wherein the external portion and the lateral portions are respectively terminated by the free external edge and the free lateral edges forming lips, a thickness of the lip terminating the external portion being greater than a thickness of the lips terminating the lateral portions.

2. The heat exchanger according to claim 1, wherein each lip is formed by a fold of a wall forming the cover portion that said lip terminates.

3. A turbomachine incorporating a heat exchanger according to claim 1.

4. An aircraft engine comprising a turbomachine according to claim 3.

5. The heat exchanger according to claim 1, wherein an area of the intake is between 60% and 70% of an area of the front face.

6. The heat exchanger according to claim 1, wherein a height of the intake is 80% of a height of the front face.

7. The heat exchanger according to claim 1, wherein a width of the intake is 80% of a width of the front face.

* * * * *